United States Patent [19]

van der Lely

[11] 4,068,724

[45] Jan. 17, 1978

[54] AGRICULTURAL IMPLEMENTS WITH SUPPORTING ROLLER

[76] Inventor: Cornelis van der Lely, 7, Bruschenrain, Zug, Switzerland

[21] Appl. No.: 466,458

[22] Filed: May 2, 1974

[30] Foreign Application Priority Data

May 3, 1973 Netherlands ................. 7306136

[51] Int. Cl.² ............................................ A01B 21/00
[52] U.S. Cl. ........................................ 172/552; 172/59; 172/68; 172/111; 172/184
[58] Field of Search .................... 172/49, 59, 63, 68, 172/111, 519, 532, 540, 552, 121, 184, 185, 187, 550, 553, 552, 554, 556, 537; 404/124; 403/167, 186

[56] References Cited

U.S. PATENT DOCUMENTS

| 573,984 | 12/1896 | Kinney | 172/552 X |
| 1,009,122 | 11/1911 | Wilder | 172/552 |
| 1,237,182 | 8/1917 | Dunham | 172/537 |
| 1,267,803 | 5/1918 | Reed | 172/553 X |
| 1,268,150 | 6/1918 | Reed | 172/553 X |
| 3,774,688 | 11/1973 | van der Lely et al. | 172/59 X |
| 3,810,434 | 5/1974 | van der Lely et al. | 172/68 X |
| 3,821,989 | 7/1974 | van der Lely et al. | 172/59 |

FOREIGN PATENT DOCUMENTS

| 108,221 | 10/1967 | Denmark | 172/184 |
| 1,187,840 | 2/1965 | Germany | 172/552 |

Primary Examiner—Edgar S. Burr
Assistant Examiner—Steven A. Bratlie
Attorney, Agent, or Firm—Mason, Mason & Albright

[57] ABSTRACT

A roller member structured to support a cultivator type implement and compress worked soil includes spaced apart generally vertical supports on a central shaft. The supports have holes that receive elongated rod elements and position same helically around the shaft to form the outer periphery of the roller. The elongate elements can be removed and replaced by two or more groups of shorter elongate elements that span only two and/or three supports and the elongate elements can be in pairs that are offset from one another around the shaft so that a minimum number of elements are needed.

7 Claims, 4 Drawing Figures

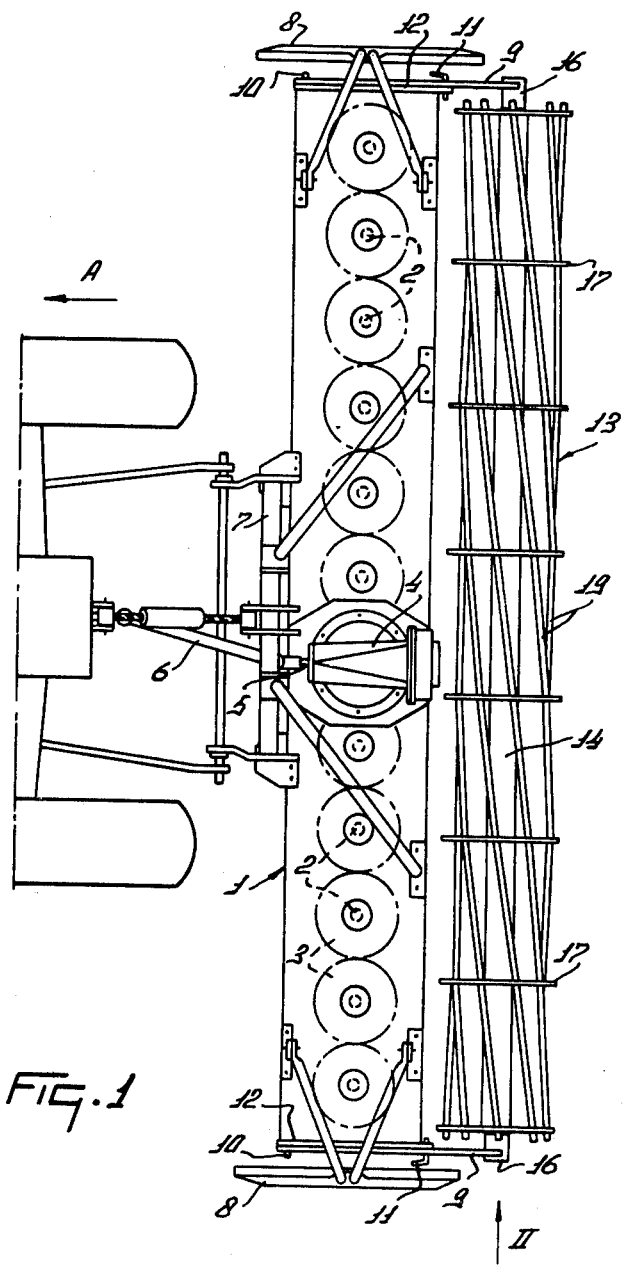

AGRICULTURAL IMPLEMENTS WITH SUPPORTING ROLLER

According to the invention, the said elongated elements are replaceable by at least two pairs of shorter elongate elements in which each shorter element has a length whose magnitude is not less than twice the distance between two immediately neighbouring supports, the shorter elements of each pair being substantially diametrically opposed to one another around the or each roller axis and at least said two pairs being angularly offset around axis relative to each other in different regions of the roller(s) by substantially 90°.

Figure 3:
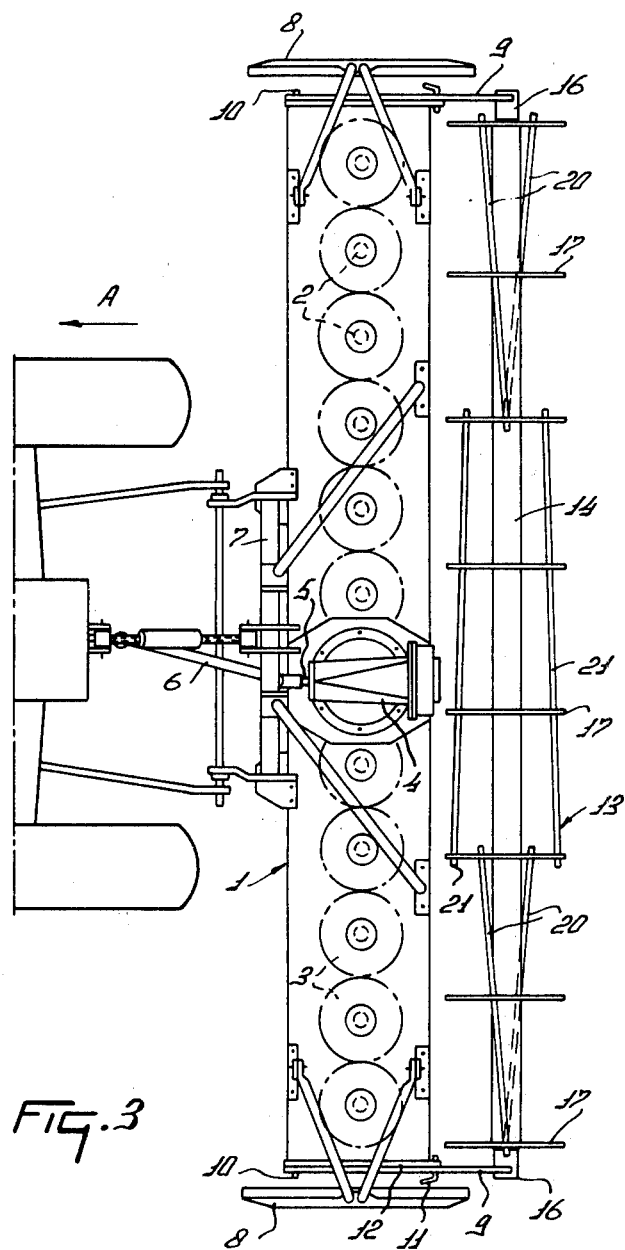

For a better understanding of the invention, and to show how the same may be carried into effect, reference will now be made, by way of example, to the accompanying drawings, in which:

FIG. 1 is a plan view of a rotary harrow connected to the rear of an agricultural tractor, the rotary harrow comprising a combined supporting member and soil compressing member that is adaptable to soil conditions by a method in accordance with the invention, FIG. 2 is a side elevation in part as seen in the direction indicated by an arrow II in FIG. 1, some parts being omitted, FIG. 3 is a plan view corresponding to FIG. 1 but shows a first way in which the combined supporting member and soil compressing member can be adapted, and FIG. 4 again corresponds to FIG. 1 but shows a second form of adaption.

Figure 4:
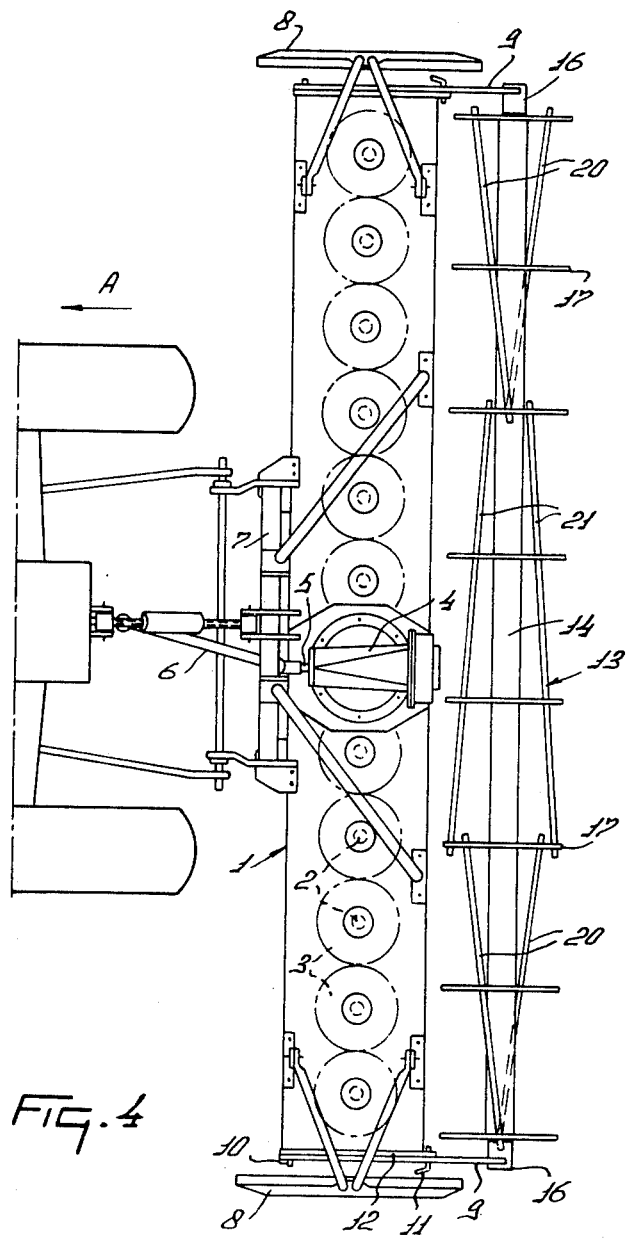

Referring to the drawings, the soil cultivating implement which is illustrated is a rotary harrow that comprises a hollow box-shaped frame portion 1 which extends substantially horizontally transverse, and normally substantially perpendicular, to the intended direction of operative travel of the harrow which is indicated in FIGS. 1, 3 and 4 by an arrow A. The frame portion 1 rotatably supports a plurality, such as twelve, of substantially vertical shafts 2 that lie in a row in regularly spaced apart relationship, the distance between neighbouring shafts preferably being substantially 25 centimeters. The lowermost ends of the shafts 2 project from beneath the bottom of the frame portion 1 and carry corresponding tined soil working members or rotors (not visible in the drawings) whose tines penetrate into the soil during operation of the harrow to work overlapping strips of ground so that, in effect, a single broad strip of ground is worked by the harrow. The shafts 2 are provided, inside the hollow frame portion 1, with corresponding straight- or spur-toothed pinions 3 which are arranged in such a way that the teeth of each pinion 3 are in mesh with those of its neighbour, or both of its neighbours, in the row thereof. One of the center pair of shafts 2 has an upward extension above the frame portion 1 into a gear box 4 mounted on top of said frame portion. The gear box 4 has a rotary input shaft 5 that projects forwardly therefrom with respect to the direction A and transmission members within the gear box 4 which it is not necessary to describe in detail, place the shaft 5 in driving communication with the extended shaft 2 and all of the other shafts 2 by way of the pinions 3. It is preferred that, as illustrated, the rear of the gear box 4 with respect to the direction A should be provided with a change-speed gear to enable the transmission ratio between the shaft 5 and the shafts 2 to be varied so that the soil working members or rotors can be driven at different speeds without changing the input speed of rotation applied to the shaft 5. In the use of the rotary harrow, the shaft 5 is placed in driven connection with the power take-off shaft of an agricultural tractor or other operating vehicle by way of an intermediate telescopic transmission shaft 6 of a construction that is known per se having universal joints at its opposite ends.

A central region of the front of the frame portion 1 with respect to the direction A is provided with a coupling member or trestle 7 that is of generally triangular configuration for co-operation with the lifting links of the three-point lifting device or hitch of the agricultural tractor or other vehicle that is employed to operate the harrow, the coupling with such lifting device or hitch being illustrated in outline in the drawings. Substantially vertically disposed screening plates 8 are disposed immediately beyond the opposite ends of the row of soil working members or rotors, said plates 8 being connected by arms to pivotal mountings on the top of the frame portion 1. The pivotal mountings define substantially horizontal axes that are substantially parallel to the direction A and, during the use of the rotary harrow, lower edge regions of the plates 8 can slide over the ground surface and the plates can turn upwardly and downwardly about the axes of their pivotal mountings to match undulations in the ground surface. The plates 8 serve to minimise ridging of the soil at the boundaries of the broad worked strip thereof and to prevent stones and the like from being flung laterally of the rotary harrow by the rapidly moving tines of the soil working members or rotors that are near to said plates 8. The plates 8 can be turned upwardly through substantially 180° about their pivotal connections to the frame portion 1 to bring them to inverted positions in which they lie on top of the frame portion 1, such positions being suitable for the inoperative transport of the harrow. The opposite lateral sides or ends of the hollow frame portion 1 are closed by substantially vertical sector plates 12 alongside which arms 9 are upwardly and downwardly turnable about a common substantially horizontal axis that is afforded by pivot pins 10 lacated at the top and front of the frame portion 1 with respect to the direction A. Rearmost regions of the plates 12 with respect to the direction A are formed with curved rows of holes that are equidistant from the axis afforded by the pivot pins 10. The arms 9 are formed with single holes at the same distance from that axis and horizontal locking pins 11 are provided for entry through the single holes in the arms 9 and chosen holes in the sector plates 12 to retain said arms in corresponding angular settings about the axis defined by the pivot pins 10.

The rearmost ends of the arms 9 with respect to the direction A carry horizontal bearings 16 in which stub shafts at the opposite ends of a central shaft 14 of a ground roller 13 are rotatably journalled. The ground roller 13 serves as a combined supporting member and soil compressing member, its supporting function being afforded by the fact that the rotary harrow hears against the ground surface during the use thereof by way of said roller 13. The holes in the sector plates 12 that are chosen for cooperation with the locking pins 11 determine the level of the axis of rotation of the roller 13 relative to that of the frame portion 1 and this setting is, accordingly, a principal factor in determining the depth of penetration of the tines of the soil working members or rotors of the harrow into the soil. The roller 13 extends substantially horizontally transverse, and normally substantially perpendicular, to the direction A throughout the effective width of the soil working members or rotors and performs its soil compressing function by rolling over, and gently flattening, the soil displaced and crumbled by the immediately preceding soil working members or rotors. The central shaft 14 is of tubular formation and its longitudinal axis coincides with the axis of rotation of the roller 13, the stub shafts at the opposite ends of the shaft 14 being freely rotatable in the bearings 16.

Supports 17 of circular configuration are secured to the tubular shaft 14 at the opposite ends thereof and at regular intervals along that shaft between its ends. The center points of the circular supports 17 coincide with the axis of rotation of the roller 13 and each support is contained in a corresponding substantially vertical plane that is substantially prallel to the direction A, said supports 17 thus being substantially perpendicular to the axis of rotation of the roller 13. It will be seen from FIG. 1 of the drawings that there is a total of eight of the supports 17 arranged in regularly spaced apart relationship along the shaft 14. Each support 17 is formed with holes 18 (FIG. 2) close to its circular periphery, said holes 18 being eight in number and being spaced apart from one another at 45° intervals around the axis of rotation of the roller 13. The holes 18 receive elongate elements 19 (not shown in FIG. 2 of the drawings) of circular cross-section which are preferably of solid rod-like formation but which could also be of tubular formation. The elongate elements 19 extend lengthwise with respect to the axis of rotation of the roller 13 but are not, in fact, parallel to that axis but are wound helically therearound. The elongate elements 19 are preferably turnable in the slightly larger diameter holes 18 and are retained against lengthwise disengagement from the supports 17 by resilient transverse "safety" pins that are not visible in the drawings. Instead of employing eight elongate members 19 as shown in FIG. 1 of the drawings, it is possible to employ only four of them arranged in such a way that their ends are spaced apart from one another at 90° intervals around the axis of rotation of the roller 13. However, with such an arrangement, there is a tendency for the interior of the roller to become filled with mud and sticky soil when the harrow is used to deal with heavy and moist land. When the roller 13 is filled with mud and the like in this way, its soil compressing function is adversely affected to a very significant extent and its supporting function to a somewhat lesser, but still significant, extent.

In order to overcame, or at least markedly reduce, the effect of mud and the like upon the roller 13 that has been described above, the present invention provides the facility of adapting the roller 13 to the nature of the soil that is to be dealt with and to the prevailing conditions, particularly but not exclusively the moisture content of the soil. To this end, the elongate elements 19 that extend throughout the effective axial length of the roller 13 can be removed and replaced by pairs of diametrically opposed shorter elongate elements 20 (FIG. 3) which it is again preferred should be of rod-like formation and circular cross-section but which may also be of tubular construction. The elements 20 are entered trough appropriate holes 18 in the supports 17 so that the whole roller 13 will still perform its supporting function. A suitable arrangement of the elements 20 is shown in FIG. 2 of the drawings from which it will be seen that, at opposite ends of the roller 13, pairs of diametrically opposed elements 20 are arranged to extend throughout axial lengths of the roller 13 that are each equal to twice the distance between two immediately neighbouring supports 17. A central region of the roller 13 that is equal in length to three times the distance between two immediately neighbouring supports 17 receives two longer elongate elements 21 that are indentical to the elements 20 except as regards their lengths. In the supports 17 which carry end regions of both the elements 20 and the elements 21, the holes 18 that co-operate with the elements 21 are turned through 90° about the axis of the roller 13 relative to the holes 18 that co-operate with the elements 20. As in the case of the elements 19 illustrated in FIG. 1 of the drawings, each of the elements 20 and 21 extends lengthwise of the roller 13 but helically around the axis of rotation thereof. When the maximum length elongate elements 19 have been replaced by shorter elongate elements 20 and 21 in the manner shown in FIG. 3 of the drawings, there will be a greatly reduced tendency for the roller 13 to become filled with mud and the like during operation on wet and heavy soil while said roller will still perform its supporting function adequately and there will be no appreciable jolting of the rotary harrow during operating that can be attributed to the adapted form of the roller 13.

When the roller 13 has been adapted to the form shown in FIG. 3 of the drawings, the opposite ends of each of the shortest elongate elements 20 are angularly offset from one another by substantially 30° when the roller is viewed lengthwise of its axis of rotation. However, it is possible to employ a steeper helical winding of the elements 20 and 21 which is such that the opposite ends of the shortest elements 20 are angularly offset from one another by substantially 45° around the axis of rotation of the roller 13 when that roller is viewed in the direction which has just been mentioned. Such an arrangement is shown in FIG. 4 of the drawings and can ensure more positive support when working on undulating or uneven ground. The method of adaption which has been described permits the roller 13 to be brought rapidly and inexpensively to a condition suitable for use with different soils and soil conditions, in particular to a condition in which it can be used with wet and heavy soils without losing its supporting and compressing functions.

Although only two examples of different arrangements of pairs of elements 20 and 21 that are shorter than the elements 19 have been described and illustrated, it will be evident that it is possible to employ a number of further arrangements in accordance with the invention in which, for example, elements of different lengths are employed in another order to that shown in FIGS. 3 and 4 of the drawings or in which short elements that are all of the same length are employed in various arrangements.

Although various steps in the methods of adaption and features of the combined supporting member and soil compressing member that have been described and/or that are illustrated in the accompanying drawings will be set forth in the following claims as inventive steps and features, it is emphasised that the invention is not necessarily limited to those steps and features and that it includes within its scope each of the method steps and each of the parts of the combined member that have been described and/or illustrated in the accompanying drawings both individually and in various combinations.

What we claim is:

1. A combined supporting and soil compressing member comprising an elongated substantially horizontal central axis shaft and a plurality of substantially radial supports, mounted along the length of said shaft at substantially regular intervals, a plurality of elongate elements detachably mounted on said compressing member and said elements extending generally in the same longitudinal direction as said shaft, said elements being positioned adjacent the peripheries of said supports and forming an outer ground engaging periphery of said compressing member, said elements being included in at least two groups and each group comprising at least one pair of said elements, each of said elements having a length that is at least equal to twice the distance of an interval between neighboring supports but substantially less than the length of said shaft, the elements of one pair in one group being diametrically opposed to one another around said shaft, said two groups being angularly offset with respect to one another around said axis shaft by about 90° and located in different but adjoining regions of said combined compressing member, each of said regions spanning at least one interval and two supports that are not common to an adjoining region.

2. A member as claimed in claim 1, wherein said elements are detachably mounted in holes adjacent the peripheries of said supports and the elements of one group span two adjacent intervals, the elements of a second group spanning three adjacent intervals.

3. A member as claimed in claim 1, wherein said elongate elements extend helically around the shaft.

4. A member as claimed in claim 1, wherein said member is connected at the rear of a soil cultivating implement and is arranged behind at least one soil working rotor of said implement with respect to the normal direction of travel of said implement, said soil working rotor being rotatable around a substantially vertical axis and said member being pivotally connected to the frame of said cultivator by arms, said arms being adjustable upwardly and downwardly in position with respect to said frame, securing means on said arms to retain said member in chosen height settings relative to said frame.

5. A member as claimed in claim 4, wherein each elongate element is a rod of substantially circular cross-section.

6. A combined supporting and soil compressing member comprising an elongated substantially horizontal central axis shaft and a plurality of radial supports mounted along the length of said shaft at substantially regular intervals, a plurality of elongate elements mounted on said compressing member and said elements extending generally in the same longitudinal direction as said shaft, said elements being positioned adjacent the peripheries of said supports and forming an outer ground engaging periphery of said compressing member, said elements being included in at least two groups and each group comprising at least one pair of said elements, the elements of one group differing in length from the elements of a second group and bridging at least two adjacent intervals of said compressing member, the elements of said second group bridging at least three adjacent intervals, each of the elements of said two groups having a length that is substantially less than the length of said axis shaft and the elements of each pair being diametrically opposed to one another around said shaft, said two groups being angularly offset with respect to one another around said axis shaft by about 90° and located in different but adjoining regions of said member, each of said regions spanning at least one interval and two supports that are not common to an adjoining region.

7. A combined supporting and soil compressing roller member comprising an elongated substantially horizontal central axis shaft and a plurality of generally circular supports mounted along the length of said shaft at substantially regular intervals, said roller member having a central region that spans three adjacent intervals between two end regions that each span two respective adjacent intervals, each of said supports having holes adjacent its outer periphery, a plurality of elongate elements detachably mounted on said supports and extending through the holes of said supports, said elements being included in at least two groups of elements, the elements of one group having different lengths than the elements of a second group and said groups being located in adjoining regions of said member, each of said regions spanning at least one interval and two supports that are not common to an adjoining region, said elements having lengths that are at least equal to twice the distance of an interval between neighboring supports but substantially less than the length of said shaft, said elements extending helically around said shaft and forming an outer ground engaging periphery of said compressing member.

* * * * *